June 11, 1968  R. A. CARLYON, JR  3,387,827
AGRICULTURAL APPARATUS
Filed May 8, 1967  3 Sheets-Sheet 1
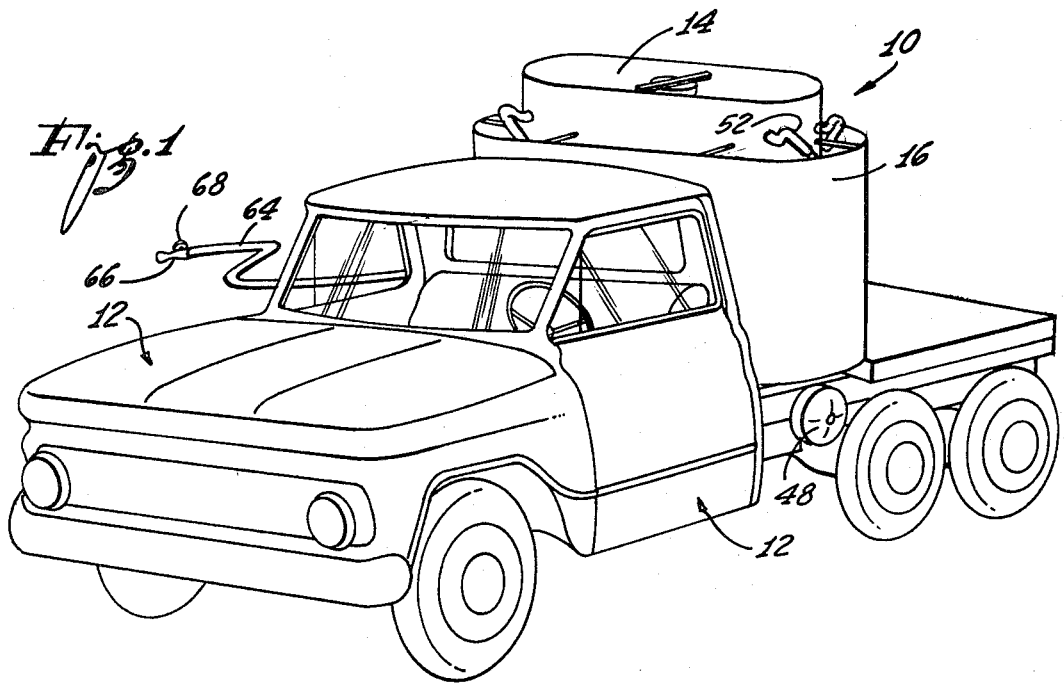
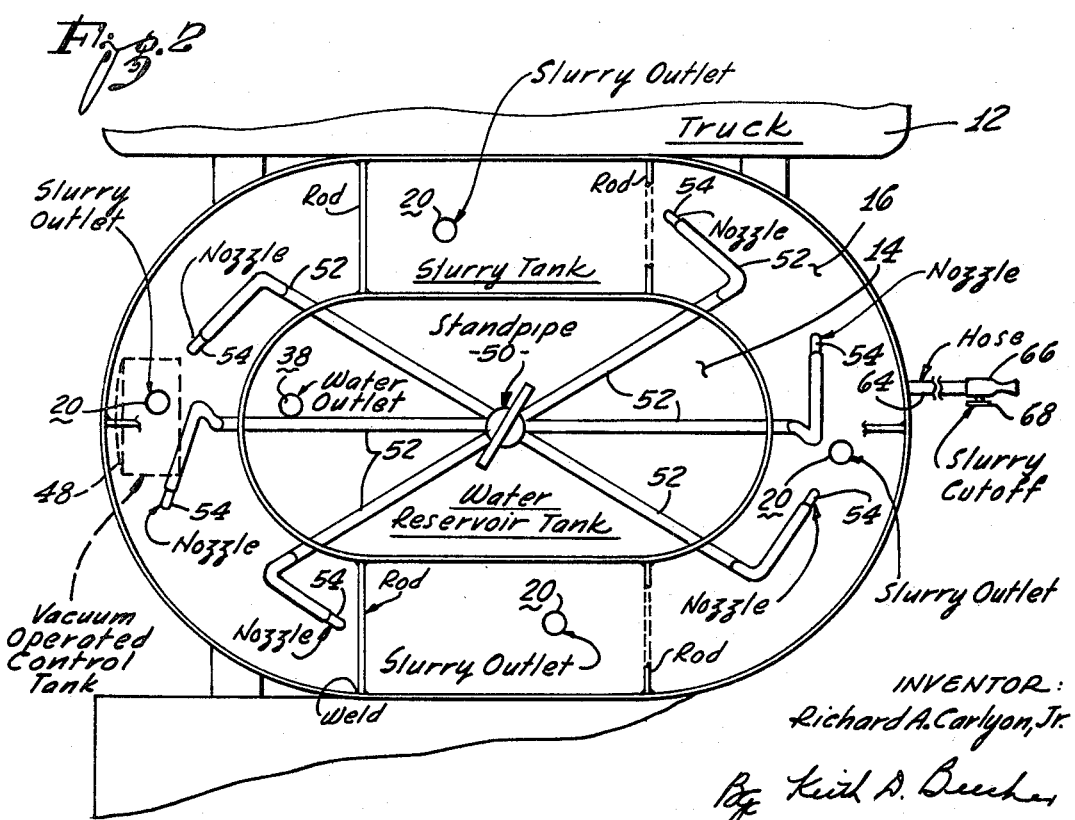
INVENTOR:
Richard A. Carlyon, Jr.
By Keith D. Beecher
ATTORNEY

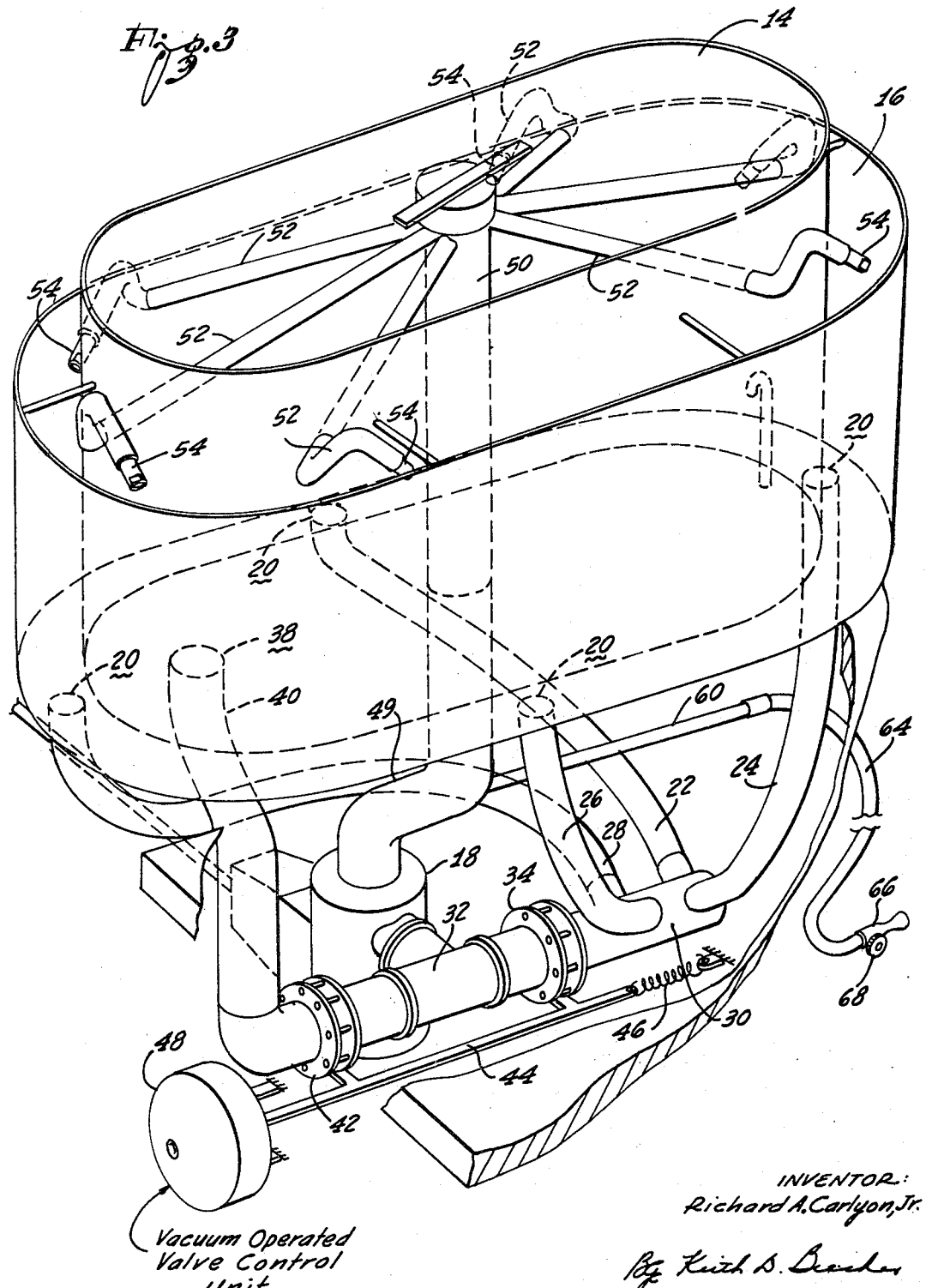

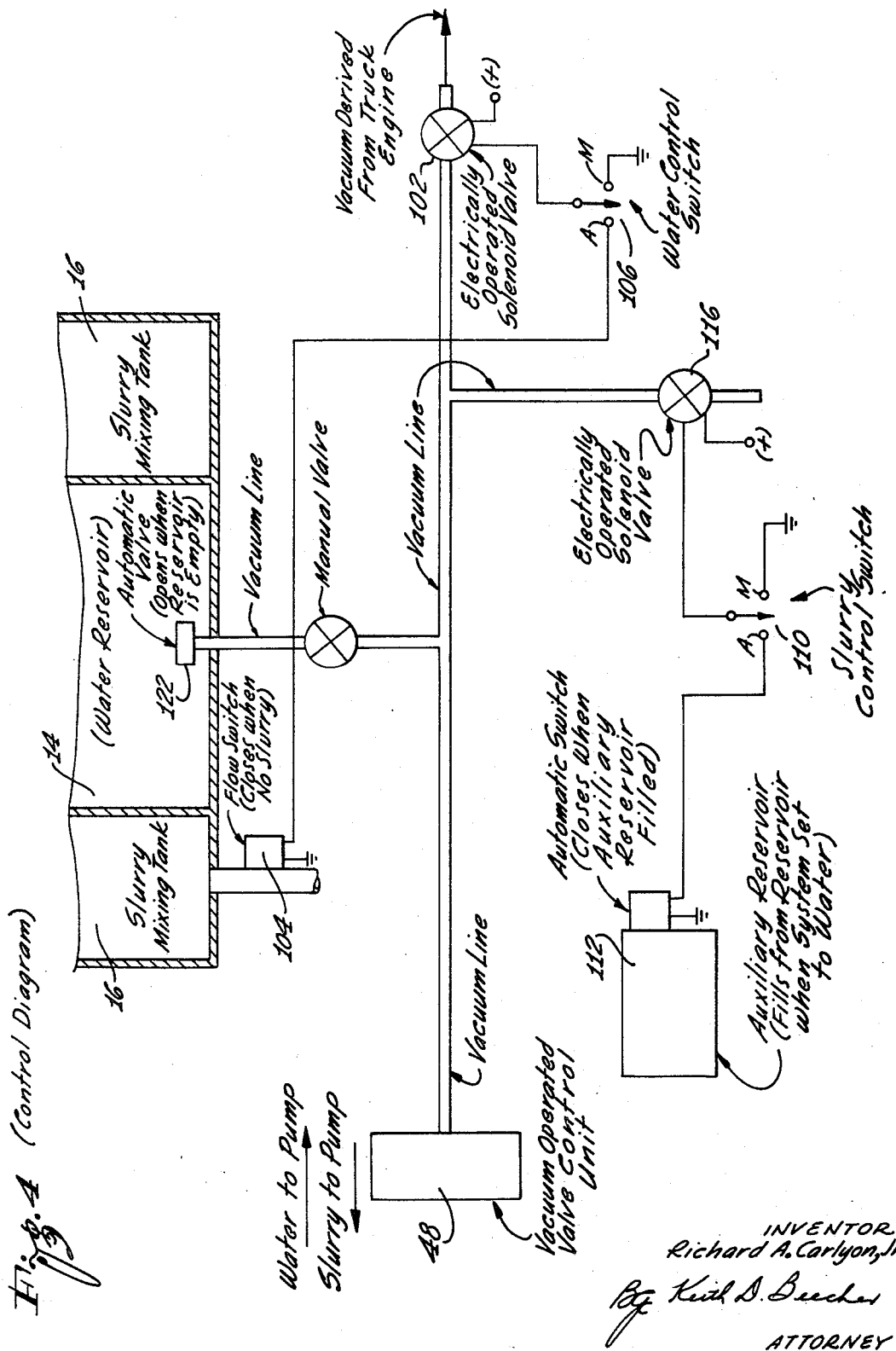

United States Patent Office 3,387,827
Patented June 11, 1968

3,387,827
AGRICULTURAL APPARATUS
Richard A. Carlyon, Jr., Hidden Hills, Calif., assignor to Sta-Soil Corporation, North Hollywood, Calif., a corporation of California
Filed May 8, 1967, Ser. No. 636,825
10 Claims. (Cl. 259—36)

ABSTRACT OF THE DISCLOSURE

The present disclosure is concerned with agricultural apparatus which may be mounted on a truck, and which may be used on-site to mulch, fertilize and seed an area, such as a lawn or slope, all in one operation. The apparatus consists of an outer mixing tank having an inner tank mounted therein for receiving water. Pump means having a valve with automatic control means is provided for pumping and mixing the materials within the tanks and for discharging the mixed materials.

Background of the invention

In the development of housing tracts, and also in the landscaping of individual homes, and the like, it has been found feasible to utilize apparatus which is capable of providing a mixture of mulch, fertilizer and seed; and such apparatus is operated on the site so that the mixture may be spread as a slurry over the area on which the lawn, or other ground cover or landscaping is to be grown.

The prior art apparatus for the above-stated purpose usually consists of a tank, and a pump and hose to be used in conjunction with the tank, all being mounted on a trailer and hauled to the site which is to be processed. The tank of the prior art apparatus is then filled with water, usually from a garden hose, and after that operation has been completed, the mulch, fertilizer and seed is poured into the tank. The ingredients are then mixed in the tank into a slurry either manually or by some mechanical means. The pump is then started, and it serves to feed the slurry from the tank and through the hose. The hose is directed by the operator over the area to be cultivated.

The improved agricultural apparatus of the present invention is particularly suited for the use described in the preceding paragraphs. However, it will become evident as the description proceeds that the apparatus has general utility wherever it is desired to cover any area, flat or slope, with a lawn, flowers, shrubbery, trees, or other ground cover.

The apparatus of the invention provides a rapid and economical method for such slope plantings of turf grass installations. The apparatus may be used for large scale commercial or public projects, as well as for the home owner and small commercial establishments. The apparatus to be described can be operated easily by one man, and it serves to seed, fertilize and mulch, all in a single operation. Moreover, if so desired, the apparatus can also apply fungicides or insecticides to the area being processed.

Summary of the invention

The apparatus of the invention includes a water reservoir tank and a separate slurry tank. In this way, the reservoir can be undergoing a filling operation, while the slurry from the slurry tank is being spread over the selected area. Thus, there is no delay between jobs, since there is no need to suspend the spreading operation, while the reservoir is being filled.

In the apparatus of the invention, a circulating channel through the pump from the slurry tank is controllably provided, so that intimate mixing of the ingredients of the slurry is effectuated by the pump, rather than by ineffectual manual or mechanical means within the tank itself.

The outlet hose for the apparatus of the invention is coupled into the aforesaid circulating channel, and it bleeds a percentage of the circulating slurry out of the apparatus. This means that a valve can be provided in the outlet hose so that the flow of the slurry to the work area can be started and stopped at will, in order to provide a complete control over the spreading operation. Whenever the valve in the outlet hose is closed, the slurry merely circulates through the system, and there is no tendency to create excessive pressure by closing the valve.

Brief description of the drawings

FIGURE 1 is a perspective ilustration of the apparatus of the present invention mounted on a truck;

FIGURE 2 is a fragmentary plan view of the apparatus, as mounted on the truck of FIGURE 1;

FIGURE 3 is a shadow perspective representation of the apparatus of the invention; and FIGURE 4 is a somewhat schematic representation of appropriate controls which may be utilized to actuate the apparatus of the invention.

Description of one embodiment of the invention

As mentioned above, a prime purpose of the agricultural apparatus of the present invention is to provide a self-contained unit, which may be driven to a selected site, and which may then be used to provide and spread a slurry of mulch, fertilizer and seed over a selected area at the site. For that purpose, the apparatus indicated generally as 10 is mounted on a truck 12. The apparatus is provided with an inner tank 14 and an outer tank 16. These tanks, as shown, are mounted on the back of the truck, with the tank 14 preferably being mounted within the tank 16 in concentric relationship therewith.

The tank 14 forms a reservoir for water. In this respect, the reservoir tank may be filled before the unit is transported to the site to be processed, so that the apparatus will be in condition for immediate use when it arrives at the site. When the apparatus is placed in operation, the water in the reservoir 14 is pumped into the outer tank 16 by means of a pump 18 (FIGURE 3).

The desired mixture of mulch, fertilizer and seed, for example, is placed in the butter tank 16 through the top, and the mixture forms a slurry with the water from the reservoir 14, as the water is pumped from the reservoir into the outer tank. Then, in a manner to be described, the system may be set to a circulate mode, so that the slurry in the outer tank 16 is circulated through the pump 18 back to the tank 16, until the ingredients of the mixture are intimately mixed with one another, and form a homogeneous slurry.

It has been found that the oval configuration of the slurry tank 16, forming a "track" around the oval inner tank 14, is preferable. This is in order to avoid any tendency for the material of the slurry to congregate and become stationary at the center of the tank.

As best shown in FIGURES 2 and 3, the slurry tank 16 is provided with a plurality of outlet ports 20. A corresponding plurality of pipelines 22, 24, 26 and 28 (FIGURE 3) couple these outlet ports to a manifold 30. The manifold 30, in turn, is coupled to a T-shaped fitting 32 through a butterfly valve 34. The fitting 32, in turn, is coupled to the inlet of the pump 18.

Likewise, the reservoir tank 14 has an outlet port 38, the latter port being coupled by a pipeline 40, through a butterfly valve 42 to the other end of the T-shaped fitting 32.

The butterfly valves 34 and 42 are of usual construction, and are commercially available. These valves are operated by a control rod 44. One end of the control rod 44 is coupled to the frame of the apparatus by means of a spring 46, and the other end of the rod is coupled to a vacuum operated control unit 48. The control unit 48 also is of known construction, and is commercially available. The unit is coupled, as will be explained, for example, to the intake manifold of the truck, so that a vacuum pressure may be derived. Whenever that vacuum pressure is applied to the control unit 48, it moves the strip 44 against the tension of the spring 46. However, when the vacuum pressure is removed, the spring 46 returns the strip 44 to its original position. In this way, the valves 34 and 42 may be selectively operated.

The control is such that when the valve 44 is in its normal spring-biased position, the valve 34 is open and the valve 42 is closed, so that the outlet ports 20 of the slurry tank 18 are coupled to the intake of the pump 18. For the second position of the control unit 48, corresponding to its vacuum actuated position, the valve 42 is opened and the valve 44 is closed. In this latter position, the outlet port 38 of the central reservoir tank 14 is coupled to the intake of the pump 18.

The outlet of the pump 18 is coupled through a hose 49 to a stand pipe 50 which extends up through the central reservoir tank 14. A plurality of radial pipelines 52 are coupled to the upper end of the stand pipe 50, and these pipe lines extend over the top of the slurry tank 16. A corresponding number of nozzles 54 are affixed to the ends of respective ones of the pipelines 52.

It will be appreciated that when the system is in a first operating condition, the valves 42 and 34 are set so that water from the central reservoir tank 14 is circulated through the outlet port 38 and through the pipeline 40 to the intake of the pump 18. The water is then pumped by the pump 18 through the stand pipe 50 and through the radial pipelines 52 and nozzles 54 into the outer slurry tank 16. The aforesaid mixture is then placed in the outer tank 16, so as to form a slurry with the water pumped into that tank from the reservoir 14.

When the slurry tank 16 is filled, the system may be set to its second mode, during which the valves 34 and 42 are controlled to couple the manifold 30, rather than the pipeline 40, to the intake of the pump 18. For this latter operating condition, the contents of the slurry tank 16 are circulated through the pump 18, up through the stand pipe 50 and out the radial pipelines 52 to the nozzles 54. This results in an intimate mixture of the ingredients of the slurry, as is desired for proper cultivation of the area to be processed.

The nozzles 54 and corresponding extremities of the pipelines 52 are oriented so that the nozzles extend, for example, approximately 45° to the corresponding horizontal and vertical planes, to impart a downward and circumferential movement of the slurry in the outer reservoir. This causes the pressurized fluid emitted from the nozzles to keep the slurry moving in the outer tank 16 around the inner tank 14, and also to force the mulch in the slurry towards the bottom of the outer tank, so as to overcome its tendency to float.

The mulch usually used in the apparatus of the invention is of the wood cellulose type, and therefore it tends to float, as mentioned above. The positioning and action of the nozzles 54 overcomes this tendency. Also, there is a further tendency of the mulch to cling together, and to form itself into chunks of dry mulch material. This tendency is completely overcome by the action of the sprays from the nozzles 54 and of the pump 18, which serve to maintain the ingredients of the slurry in a finally divided condition.

As mentioned above, the configuration of the apparatus of the invention causes the slurry to move rapidly around the oval "race track" formed by the slurry tank 16 in conjunction with the outer surface of the reservoir tank 14. This overcomes any tendency for the slurry to congregate and become stationary in the center, as occurs when a single tank is used. Also, the slurry runs out the outlet ports 20 in the bottom of the tank 16 during the circulate mode, to become intimately mixed by the pump 18. At the same time, and as mentioned above, the placement of the nozzles 54 keeps the mulch material itself from floating on top of the slurry in the outer tank 16.

It will be appreciated that while the agricultural apparatus of the invention is in operation, that is, during its circulate mode; the central reservoir tank 14 can be filled with water, so that the apparatus will be immediately available for the next job.

An outlet pipeline 60 is coupled to the hose 49 which couples the outlet of the pump 18 to the stand pipe 50. A hose 64 is coupled to the end of the pipeline 60, and a usual nozzle 66, together with a control valve 68, is mounted on the end of the hose 64. It will be appreciated that when the apparatus is in the circulate mode, a portion of the circulating slurry can be withdrawn and spread over the work site, merely by opening the valve 68. This causes a percentage of the circulating slurry to flow through the hose 64 and through the nozzle 66 to be spread over the site. Whenever it is desired, the valve 68 may be closed. This creates no excessive force or tension in the apparatus, since the slurry merely continues to circulate, as described above.

The pump 18, for example, may be a centrifugal type of trash pump, many of which are available on the market today. This pump may conveniently be driven directly by the transmission of the truck on which the apparatus is mounted. Trash pumps are available today, which for example will pass solid items as large as 2" in diameter, so that there is no danger of clogging. Also, such pumps are equipped with quick clean-out devices to facilitate the cleaning operation.

As mentioned above, the butterfly valves 34 and 32 are controlled by the control rod 44, so that one of the two valves is always closed when the other valve is opened, and vice versa. Also, the control rod 44 is controlled by a vacuum operated control unit 48. An appropriate control for the unit 48 is shown, for example, in the control diagram of FIGURE 4.

As shown, a vacum line 100 extends from the vacuum control unit 48 through an electrically operated solenoid valve 102 to, for example, the intake manifold of the truck engine. So long as the engine is running, a vacuum is developed. Then, when the valve 102 is operated, this vacuum is exerted on the control unit 48. Whenever the vacuum is imposed on the control unit 48, the unit moves the valves 42 and 34 of FIGURE 3 from the "circulate" condition of the system, to the condition in which water is introduced to the pump 18 from the central reservoir 14. On the other hand, when the vacuum pressure is released, the control unit 48 permits the control rod 44 and spring 46 of FIGURE 3 to return the valves 34 and 42 to the "circulate" condition, in which slurry from the outer tank 16 is introduced to the intake of the pump 18.

The valve 102 may be controlled manually, merely by setting a manual switch 106 to the right in FIGURE 4. Such setting completes a connection through the solenoid valve 102, so as to energize the valve and open the vacuum line 100 to the intake of the engine.

A flow switch 104 of any usual construction is placed on one of the pipelines from the slurry tank 16, such as the line 24. This switch is constructed so as to close when no slurry passes through the pipeline 24, indicating that the slurry mixing tank 16 is empty. Then, should the switch 106 be set to the automatic A position, the system will remain in the "circulate" mode until the slurry mixing tank 16 is empty. When that condition arises, the system will be automatically switched to the other mode, as the switch 104 completes the circuit. When the system is in the latter mode, the intake of the pump 18 is coupled to the reservoir 14, so that water passes through the pipeline 40 of FIGURE 3 to the pump 18, and is pumped into the outer tank 16.

It may now be desirable only to pass sufficient water to flush out the system when the control described in the preceding paragraph is effectuated. For that purpose, a second switch 110 may be set to the automatic A position. An auxiliary reservoir 112 is provided, and an appropriate pipeline (not shown) couples the reservoir 14 to the auxiliary reservoir 112 so that the auxiliary reservoir also fills with water, whenever the pump 18 pumps water from the reservoir 14 to the tank 16. When the auxiliary reservoir is filled, a float switch 114 of usual construction closes. This causes a further solenoid valve 116 to be energized, so as to open the vacuum line 100 to the atmosphere. Therefore, after a predetermined time, as determined by the time required to fill the auxiliary reservoir 112, the system will again be switched back to the "circulate" mode, and preferably stop.

The switch 110 also has a "manual" position M, to which it may be actuated at any time to complete the circuit to the solenoid valve 116 and, thereby, set the system to the "circulate" mode. The auxiliary reservoir 112 may be controlled to empty whenever the system is set to the "circulate" mode. Moreover, the auxiliary reservoir 112 may be positioned to overflow into the reservoir 14.

A further control may also be provided, whereby the system is automatically switched over to the "circulate" mode, whenever the reservoir 14 is empty. For this purpose, a branch 100a of the vacuum line 100 is coupled through a manually controlled valve 120 to a further valve 122 in the reservoir 14. The latter valve is of any appropriate construction, and it serves to open the vacuum line 100 to the atmosphere whenever the water reservoir 14 is empty. Then, if the manual valve 120 is open, the system automatically is shifted over to the "circulate" mode when the reservoir 14 is empty.

The invention provides, therefore, self-contained agricultural apparatus which, as described, may be used whenever it is desirable to cover a desired area with mulch, fertilizer, seed, or the like. The apparatus may be used, for example, for planting flowers, grass, shrubs, trees, etc., on slopes or level areas, and it may be used for planting lawns, and the like, wherever desired.

As also mentioned, the apparatus is well suited for the small jobs involving the individual homeowners, for example, or for large commercial or public projects.

While a particular embodiment of the invention has been described, modifications may be made. It is intended to cover all modifications in the following claims which come within the true scope of the invention.

What is claimed is:

1. Agricultural apparatus for providing a mixture containing mulch, seed, fertilizer, and the like, to a selected area to be cultivated, said apparatus including: an inner tank for providing a reservoir for water; an outer tank mounted concentrically with said inner tank and forming an annular reservoir surrounding the exterior of said inner tank for a slurry of the aforesaid mixture and water; a pump having an intake and an outlet; pipeline means coupling said intake of said pump to said inner tank and coupling said outlet of said pump to said outer tank, said pipeline means including a plurality of pipelines extending into the upper portion of said annular reservoir for directing pressurized fluid into said reservoir in a direction to keep the slurry moving in said reservoir around the exterior of said inner tank and also to force mulch in said slurry down towards the bottom of said reservoir; and valve means included in said pipeline means and actuable to a first position in which the intake of said pump is coupled to said inner tank to permit said pump to pump water from said inner tank to said annular reservoir, and actuable to a second position in which the intake of said pump is coupled to said outer tank to permit said pump to circulate the contents of said reservoir.

2. The apparatus defined in claim 1 in which said pipeline means includes a stand pipe coupled to the outlet of said pump and extending up through said inner tank, and in which said plurality of pipelines extend radially from the top of said stand pipe into the upper portion of said reservoir.

3. The apparatus defined in claim 2, and which includes nozzle means affixed to the ends of respective ones of said pipelines.

4. The apparatus defined in claim 1 in which said first and second tanks have an oval configuration and are mounted concentrically within one another.

5. The apparatus defined in claim 1 and which includes an outlet hose coupled to said pipeline means at the outlet of said pump, and a control valve mounted on said hose.

6. The apparatus defined in claim 1 in which said pipeline includes a manifold, and a plurality of pipelines extending from respective outlet ports in said annular reservoir to said manifold, and in which said valve means couples said manifold to the intake of said pump for said second position of said valve means.

7. The apparatus defined in claim 1, in which said pipeline means includes a pipeline extending from an outlet port in said inner tank; and in which said valve means couples said last-named pipeline to the intake of said pump for said first position of said valve means.

8. The apparatus defined in claim 1 and which includes a vacuum operated unit for controlling the operation of said valve means.

9. The apparatus defined in claim 1 and which includes automatic control means for setting said valve means to said first position for a predetermined interval when said outer tank is empty.

10. The apparatus defined in claim 1 and which includes automatic control means for setting said valve means to said second position when said inner tank is empty.

References Cited

UNITED STATES PATENTS

| 689,799 | 12/1901 | Graves | 259—60 X |
| 2,692,798 | 10/1954 | Hicks | 259—95 X |

FOREIGN PATENTS

| 652,142 | 4/1951 | Great Britain. |

ROBERT W. JENKINS, *Primary Examiner.*